(12) United States Patent
Komatsu et al.

(10) Patent No.: US 6,652,953 B2
(45) Date of Patent: *Nov. 25, 2003

(54) MAGNETIC RECORDING MEDIUM

(75) Inventors: Kazunori Komatsu, Kanagawa (JP); Seiji Kasahara, Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 6 days.

(21) Appl. No.: 09/358,552

(22) Filed: Jul. 22, 1999

(65) Prior Publication Data
US 2002/0098384 A1 Jul. 25, 2002

(30) Foreign Application Priority Data
Jul. 22, 1998 (JP) ............................... 10-206754
Aug. 11, 1998 (JP) ............................... 10-227128

(51) Int. Cl.$^7$ ............................... G11B 5/64; G11B 5/73
(52) U.S. Cl. ................ 428/141; 428/323; 428/336; 428/409; 428/694 T; 428/694 SG
(58) Field of Search .................. 428/694 BN, 694 SG, 428/141, 336, 323, 409, 694 T

(56) References Cited

U.S. PATENT DOCUMENTS 5,712,028 A * 1/1998 Seki et al. ............... 428/216
5,955,189 A * 9/1999 Ejiri et al. ............... 428/323
6,083,617 A * 7/2000 Aoyama et al. ........... 428/327

FOREIGN PATENT DOCUMENTS

JP 08-102046 A * 4/1996

OTHER PUBLICATIONS

JPO Abstract Translation of JP 08–102046A (Clipped Image No. JP408102046A).*

* cited by examiner

Primary Examiner—Paul Thibodeau
Assistant Examiner—Kevin M. Bernatz
(74) Attorney, Agent, or Firm—Sughrue Mion, PLLC

(57) ABSTRACT

A magnetic recording medium includes a support, and a single magnetic layer having a thickness of 0.3 μm or less, which contains nonmagnetic particles. In the magnetic medium, the thickness of the single magnetic layer is equal to or larger than an average particle diameter of the nonmagnetic particles.

10 Claims, No Drawings

MAGNETIC RECORDING MEDIUM

BACKGROUND OF THE INVENTION

1. Field of the Invention

The present invention relates to a magnetic recording medium. More specifically, the present invention relates to a magnetic recording medium which is excellent in surface properties and capable of achieving high output.

2. Description of the Related Art

Magnetic layers comprising a ferromagnetic iron oxide, a Co-modified iron oxide, $CrO_2$, or a ferromagnetic alloy powder dispersed in a binder, which are coated on a nonmagnetic support, have been widely known in magnetic recording media such as a video tape, an audio tape, a magnetic disc, etc. In recent years, recording wavelength tends to become shorter with the increase of density of recording system. The thickness loss at recording/reproduction, such as the reduction of output, has become a problem in a magnetic layer having a comparatively thick layer thickness. Therefore, the thickness of a magnetic layer has been thinner. As a method of thinning a magnetic layer while maintaining surface properties, a method of simultaneous multilayer coating comprising coating an upper thin magnetic layer on a lower nonmagnetic layer has been adopted.

However, there are problems in such a simultaneous multilayer coating method such as noise generates due to the turbulence in the interface between the upper layer and the lower layer and the packing density of the upper magnetic layer reduces due to the migration of the binder from the lower layer to the upper layer (the binder contained in the lower layer migrates to the upper layer where the concentration of the binder is lower than that of the lower layer). As a result, good electromagnetic characteristics cannot be obtained. For resolving these problems, based on the thought that the reduction of the numbers of interfaces resulting in the reduction of noises, a magnetic recording medium comprising a single magnetic layer without providing a lower nonmagnetic layer was produced and evaluation was carried out. However, contrary to our expectations, electromagnetic characteristics could not be improved in the case of a thin layer medium having the dry thickness of a magnetic layer of 0.31 µm or less.

SUMMARY OF THE INVENTION

It is an object of the present invention to provide a magnetic recording medium having an excellent surface property and an excellent electromagnetic conversion characteristic.

As a result of the inventors' examination, it was found that surface properties of a magnetic layer were deteriorated due to the presence of nonmagnetic particles such as abrasive particles or carbon particles contained in a magnetic solution for forming a magnetic layer, thereby desired electromagnetic characteristics could not be obtained.

As a result of further examinations, the present inventors have found that a magnetic recording medium having good surface properties and excellent electromagnetic conversion characteristics could be obtained even in a thin layer medium having the dry thickness of a magnetic layer of 0.3 µm or less by using nonmagnetic particles having the relationship that the dry thickness of the magnetic layer is equal to or larger than the average particle diameter of the nonmagnetic particles. Thus, the present invention has been attained.

According to the present invention, a magnetic recording medium comprising a support and a single magnetic layer having a dry thickness of 0.3 µ or less (preferably, 0.01 µm or more) provided on the support, wherein the average particle diameter of the nonmagnetic particles contained in the magnetic solution comprising the magnetic layer and the dry thickness of the magnetic layer have a relationship where the dry thickness of the magnetic layer is equal to or larger than the average particle diameter of the nonmagnetic particles.

When a magnetic recording medium has a magnetic layer having a dry thickness of 0.3 µm or less (preferably, 0.01 µm or more) and a nonmagnetic lower layer is provided under the magnetic layer, even if nonmagnetic particles larger than the thickness of the magnetic layer are present in the magnetic layer, they are crushed to the lower nonmagnetic layer by calendering process. As a result good surface properties can be obtained.

However, when a magnetic recording medium comprises a single magnetic layer having a dry thickness of 0.3 µm or less (preferably, 0.01 µm or more), nonmagnetic particles in a magnetic layer cannot be crushed to the lower nonmagnetic layer by calendering process, therefore, the surface properties are deteriorated.

Accordingly, it has been found that for ensuring surface properties it is necessary to use nonmagnetic particles which satisfy the relationship where the dry thickness of a magnetic layer is equal to or larger than the average particle diameter of the nonmagnetic particles.

As a result of further investigations, when a support satisfying the condition that, when measured using ATM, in 30 µm×30 µm square, the support has 1,000 or less protrusions having a height of 30 nm or more, 500 or less protrusions having a height of 40 nm or more, and 200 or less protrusions having a height of 50 nm or more is used, good surface properties and excellent electromagnetic characteristics can be obtained in a thin magnetic medium having a dry thickness of 0.3 µm or less (preferably, 0.01 µm or more). Thus, the present invention has been achieved.

That is, the above object of the present invention has been resolved by a magnetic recording medium comprising a support and a single magnetic layer having a dry thickness of 0.3 µm or less (preferably, 0.01 µm or more) provided on the support, wherein the surface of the support has 1,000 or less protrusions having a height of 30 nm or more, 500 or less protrusions having a height of 40 nm or more, and 200 or less protrusions having a height of 50 nm or more when measured using ATM in 30 µm×30 µm square.

Here, the magnetic layer defined in the present invention means a magnetic recording layer which can perform recording by magnetism.

Further, the single layer defined, in the present invention includes not only a single magnetic layer medium but also the case comprising a magnetic layer medium and a thin undercoating layer for improving the adhesion property of the magnetic layer medium, or a thin overcoat lubricating layer for improving running property and durability of the magnetic recording layer.

The above-described nonmagnetic particles include abrasive particles and carbon particles.

DETAILED DESCRIPTION OF THE INVENTION

The present invention will be described in detail below with reference to specific examples, but it should not be construed as the present invention is not limited thereto.

EXAMPLES 1 TO 5 AND COMPARATIVE EXAMPLES 1 TO 13

Regarding Examples 1 to 5 and Comparative Examples 1 to 13, a coating solution for a magnetic layer was prepared according to the following prescription.

| Prescription of Magnetic Layer | |
|---|---|
| Ferromagnetic metal fine particles | 100 parts |
| Composition: Fe/Zn/Ni = 92/4/4 | |
| Hc: 1,600 Oe | |
| Specific surface area by BET method: 60 m$^2$/g | |
| Crystallite size: 195 Å | |
| Average long axis length: 0.20 µm, | |
| Acicular ratio: 10 | |
| Saturation magnetization ((σs): 130 emu/g | |
| Vinyl chloride copolymer | 12 parts |
| Content of an —SO$_3$Na group: 1 × 10$^{-4}$ eq/g | |
| polymerization degree: 300 | |
| Polyester polyurethane resin | 3 parts |
| Neopentyl glycol/caprolactone polyol/MDI = 0.9/2.6/1 | |
| Content of an —SO$_3$Na group: 1 × 10$^{-4}$ eq/g | |
| α-Alumina (average particle diameter da) | 2 parts |
| Carbon black (average particle diameter dc) | 0.5 parts |
| Butyl stearate | 1 part |
| Stearic acid | 2 parts |
| Methyl ethyl ketone | 200 parts |

The above components of the coating solution were mixed and kneaded by means of a continuous kneader and dispersed by a sand mill. To the thus-obtained dispersion solution 3 parts of polyisocyanate were added, further 40 parts of butyl acetate were added and filtered through a filter having an average pore diameter of 1 µm to obtain the coating solution for a magnetic layer.

The above-obtained coating solution for a magnetic layer was coated on a polyethylene terephthalate support having a thickness of 7 µm and central average surface roughness of 0.002 µm in a dry thickness of 0.1 µm or 0.3 µm. The coated layer was oriented with a cobalt magnet having a magnetic force of 3,000G and a solenoid having a magnetic force of 1,500G while the coated layer was still wet. After drying, the coated layer was subjected to calendering treatment with calenders of 7 stages consisting of metal rolls at 90° C. The obtained web was slit to a width of 8 mm. Thus, samples of an 8 mm video tape in Examples 1 to 5 and Comparative Examples 1 to 13 were produced.

In the above manner, nine kinds of coating solutions A to I which were prepared by combining three kinds of average particle sizes da of 0.1, 0.3 and 0.4 µm as α-alumina and three kinds of average particle sizes dc of 0.1, 0.3 and 0.4 µm as carbon black were used.

Combinations of average particle size da and average particle size dc and corresponding coating solution names are shown in the following Table 1.

TABLE 1

| dc (µm) | da (µm) | | |
|---|---|---|---|
| | 0.1 | 0.3 | 0.4 |
| 0.1 | A | B | E |
| 0.3 | C | D | G |
| 0.4 | F | H | I |

Magnetic layer thickness, name of coating solution, surface roughness of a tape Ra and Rt, and 7 MHz output are shown in the following Table 2.

TABLE 2

| | Magnetic Layer Thickness | Coating Solution | Ra (nm) | Rt (nm) | 7 MHz Output (relative value with output of Example 5 being 0 dB) | Evaluation |
|---|---|---|---|---|---|---|
| Example 1 | 0.1 µm | A | 3.1 | 28 | 0.1 dB | ○ |
| Comparative Example 1 | | B | 7.1 | 33 | −3.1 dB | * |
| Comparative Example 2 | | C | 6.5 | 33 | −3.1 dB | x |
| Comparative Example 3 | | D | 7.3 | 33 | −3.5 dB | x |
| Comparative Example 4 | | E | 8.1 | 31 | −3.9 dB | x |
| Comparative Example 5 | | F | 6.9 | 33 | −3.3 dB | x |
| Comparative Example 6 | | G | 8.4 | 31 | −4.2 dB | x |
| Comparative Example 7 | | H | 7.1 | 35 | −3.3 dB | x |
| Comparative Example 8 | | I | 8.5 | 34 | −4.2 dB | x |
| Example 2 | 0.3 µm | A | 2.8 | 27 | 0.9 dB | ○ |
| Example 3 | | B | 3.3 | 29 | 0.2 dB | ○ |
| Example 4 | | C | 2.9 | 29 | 0.5 dB | ○ |
| Example 5 | | D | 3.4 | 31 | 0 dB | ○ |
| Comparative Example 9 | | E | 6.1 | 29 | −2.9 dB | x |
| Comparative Example 10 | | F | 5.8 | 33 | −2.7 dB | x |
| Comparative Example 11 | | G | 6.3 | 31 | −3.1 dB | x |
| Comparative Example 12 | | H | 6.2 | 30 | −3.4 dB | x |
| Comparative Example 13 | | I | 6.7 | 33 | −3.4 dB | x |

(1) Surface roughness

Surface roughness was measured by 3d-MIRAU method. Surface roughness Ra of the area of about 250×250 µm$^2$ and Peak-Valley (Rt) were measured with TOPO3D (a product of WYKO) by MIRAU method. The wavelength of measurement was 650 nm and spherical compensation and cylindrical compensation were applied. This system is an optical interference type non-contact surface roughness meter.

(2) 7 MHz Output

7 MHz signals were recorded using an 8 mm video deck, FUJIX 8 manufactured by Fuji Photo Film Co., Ltd. These signals were reproduced and 7 MHz signal reproduction output was measured using an oscilloscope. Evaluation was according to relative evaluation taking the value in Example 5 as a standard.

As is apparent from the results in Table 2, when the dry thickness of the magnetic layer is 0.1 µm, only the sample in Example 1, where coating solution A having average particle diameters of both da and dc of 0.1 µm or less was used, showed small surface roughness, i.e., Ra is 3.1 nm and Rt is 28 nm, thus good surface properties could obtained. Further, 7 MHz signal reproduction output was +0.1dB based on that of Examples 5, which showed that good output can be obtained. On the other hand, Comparative Examples 1 to 8 had dry thickness of the magnetic layer being 0.1 µm, at least either average particle diameter da or dc larger than the dry thickness of the magnetic layer 0.1 µm, surface roughness Ra was 6.5 nm or more and Rt is 31 nm or more, and therefore, good surface properties could not be obtained. Further, 7 MHz signal reproduction output is minus based on Example 5, which shows that good output cannot be obtained.

In addition, when the dry thickness of the magnetic layer is 0.3 μm, samples of Examples 2 to 5, where average particle diameters of both da and dc are 0.3 μm or less, showed small surface roughness, i.e., Ra is 3.4 nm and Rt is 31 nm, thus good surface properties could obtained. Further, 7 MHz signal reproduction output based on Example 5 of Examples 2 to 4 was plus, which shows that good output can be obtained. On the other hand, Comparative Examples 9 to 13 had dry thickness of the magnetic layer being 0.3 μm, at least either average particle diameter da or dc larger than the dry thickness of the magnetic layer 0.3 μm, surface roughness Ra was 5.8 nm or more and Rt was 29 nm or more, and therefore, good surface properties could not be obtained. Further, 7 MHz signal reproduction output was minus based on Example 5, which showed that good output could not be obtained.

From the above, it can be concluded that in a magnetic recording medium comprising a thin single magnetic layer having a dry thickness of 0.3 μm or less, even when magnetic layers have magnetic layer thickness of, e.g., 0.15 μm, 0.2 μm, and 0.25 μm, which are not shown in the examples, as well as the layer thickness of 0.1 μm and 0.3 μm shown in the examples, if average particles of nonmagnetic particles contained in a magnetic solution are not larger than the dry thickness of the magnetic layer, then magnetic layers are not influenced by nonmagnetic particles if the magnetic layers are compressed by calendering process. Therefore, excellent surface properties and electromagnetic characteristics can be obtained.

According to the present invention, in a single magnetic recording medium having a dry thickness of 0.3 μm or less (preferably, 0.01 μm or more), since the average particle diameter of the nonmagnetic particles contained in the magnetic solution containing the magnetic layer and the dry thickness of the magnetic layer have the relationship where the dry thickness of the magnetic layer is equal to or larger than the average particle diameter of the nonmagnetic particles, a magnetic recording medium having good surface properties and excellent electromagnetic characteristics can be obtained.

EXAMPLES 6 TO 14 AND COMPARATIVE EXAMPLES 14 TO 19

Regarding Examples 6 10 14 and Comparative Examples 14 to 19, a coating solution for a magnetic layer was prepared in the same manner as described above (Examples 1 to 5 and Comparative Examples 1 to 13) Incidentally, the average diameter da of α-alumina is 0.1 μm, and the average diameter dc of carbon black is 0.08 μm.

The above-obtained coating solution for a magnetic layer was coated on a polyethylene terephthalate support having a thickness of 7 μm and central average surface roughness of 0.002 μm in a dry thickness of 0.1, 0.2 or 0.3 μm. The coated layer was oriented with a cobalt magnet having a magnetic force of 3,000G and a solenoid having a magnetic force of 1,500G while the coated layer was still wet. After drying, the coated layer was subjected to calendering treatment with calenders of 7 stages consisting of metal rolls at 90° C. The obtained web was slit to a width of 8 mm. Thus, samples of an 8mm video tape in Examples 6 to 14 and Comparative Examples 14 to 19 were produced.

The relationship between the height of the protrusion and numbers of the protrusions in 30 μm×30 μm square in the polyethylene terephthalate bases which were used are shown in Table 3 below.

TABLE 3

| Kind of Support | Numbers of Protrusions Having a Height of 30 nm or more | Numbers of Protrusions Having a Height of 40 nm or more | Numbers of Protrusions Having a Height of 50 nm or more |
|---|---|---|---|
| V | 88 | 23 | 8 |
| W | 925 | 411 | 137 |
| X | 980 | 480 | 180 |
| Y | 1,020 | 520 | 220 |
| Z | 1,119 | 593 | 261 |

Magnetic layer thickness, name of coating solution, surface roughness of a tape Ra and Rt, and 7 MHz output are shown in the following Table 4.

TABLE 4

| | Magnetic Layer Thickness | Support | Ra (nm) | Rt (nm) | 7 MHz Output (relative value with output of Example 8 being 0 dB) | Evaluation |
|---|---|---|---|---|---|---|
| Example 6 | 0.1 μm | V | 3.1 | 31 | 1.3 dB | ○ |
| Example 7 | | W | 3.2 | 54 | 0.4 dB | ○ |
| Example 8 | | X | 3.2 | 61 | 0.0 dB | ○ |
| Comparative Example 14 | | Y | 3.3 | 101 | −6.3 dB | x |
| Comparative Example 15 | | Z | 3.4 | 145 | −8.2 dB | x |
| Example 9 | 0.2 μm | V | 2.9 | 29 | 1.7 dB | ○ |
| Example 10 | | W | 2.9 | 42 | 1.5 dB | ○ |
| Example 11 | | X | 3.0 | 51 | 1.0 dB | ○ |
| Comparative Example 16 | | Y | 3.0 | 98 | −6.1 dB | x |
| Comparative Example 17 | | Z | 3.1 | 136 | −7.7 dB | x |
| Example 12 | 0.3 μm | V | 2.8 | 29 | 1.8 dB | ○ |
| Example 13 | | W | 3.0 | 39 | 1.5 dB | ○ |
| Example 14 | | X | 2.9 | 46 | 1.1 dB | ○ |
| Comparative Example 18 | | Y | 3.0 | 91 | −5.5 dB | x |
| Comparative Example 19 | | Z | 3.1 | 124 | −7.3 dB | x |

1) Surface roughness

Surface roughness was measured by 3d-MIRAU method. Surface roughness Ra of the area of about 250×2501 m² and Peak-Valley (Rt) were measured with TOPO3D (a product of WYKO) by MIRAU method. The wavelength of measurement was 650 nm and spherical compensation and cylindrical compensation were applied. This system is a light interference type non-contact surface roughness meter.

7 MHz Output

7 MHz signals were recorded using an 8mm video deck, FUJIX 8 manufactured by Fuji Photo Film Co., Ltd. These signals were reproduced and 7 MHz signal reproduction output was measured using an oscilloscope. Evaluation was according to relative evaluation taking the value in Example 8 as a standard.

As is apparent from the results in Table 4, when the thickness of the magnetic layer is 0.1, 0.2 or 0.3 μm, and the kinds of the support are V, W and X, that is, when the protrusions of the height of 30 nm or more are 980 or less, the protrusions of the height 40 nm or more are 480 or less, and the protrusions of the height 50 nm or more are 180 or less, the Examples 6, 7, 9 to 14 exhibited surface roughness Ra of 3.2 μm or less and Rt of 61 nm or less, therefore good surface properties was obtained. Further, 7 MHz signal reproduction output was plus in Examples 6, 7, 9 to 14, therefore good output was obtained.

On the other hand, Comparative Examples 14 to 19, when the kind of the supports are Y and Z, that is, the protrusions of the height of 30 nm or more are 1,020 or more, the protrusions of the height of 40 nm or more are 520 or more, and the protrusions of the height of 50 mn or more are 220 or more, the Comparative Examples exhibited the surface roughness Ra of 3.0 nm or more, Rt of 91 nm or more, therefore, good surface properties were not be obtained. Further, 7 MHz signal reproduction output was minus based on Example 8, Comparative Examples 14 to 19, therefore, good output was not be obtained.

From the above, when the support has 1,000 or less protrusions having a height of 30 nm or more, 500 or less protrusions having a height of 40 nm or more, and 200 or less protrusions having a height of 50 nm or more in 30 μm×30 μm square is used, good surface properties and excellent electromagnetic characteristics can be obtained.

Further, according to Table 4, it is preferable that the support has 100 or less protrusions having a height of 30 nm or more, 30 or less protrusions having a height of 40 nm or more, and 10 or less protrusions having a height of 50 nm or more in 30 μm×30 μm square.

According to the present invention, in the magnetic recording medium having a support and a single magnetic layer having a dry thickness of 0.3 μm or less (preferably, 0.01 μm or more) provided on the support, the surface of the support has 1,000 or less protrusions having a height of 30 nm or more, 500 or less protrusions having a height of 40 nm or more, and 200 or less protrusions having a height of 50mu or more in 30 μm×30 μm square when measured using ATM, good surface properties and excellent electromagnetic characteristics can be obtained.

What is claimed is:

1. A magnetic recording medium consisting essentially of:
   a support; and
   a single magnetic layer having a thickness of 0.3 μm or less, which contains nonmagnetic particles;
   wherein the thickness of the single magnetic layer is equal to or larger than an average particle diameter of the nonmagnetic particles, and
   wherein a surface of the support has 1 to 1,000 protrusions having a height of 30 nm or more, p to 500 protrusions having a height of 40 nm or more, and 0 to 200 protrusions having a height of 50 nm or more in 30 μm ×30 μm square when measured using ATM.

2. The magnetic recording medium as claimed in claim 1, wherein the nonmagnetic particles comprise abrasives.

3. The magnetic recording medium as claimed in claim 1, wherein the nonmagnetic particles comprise carbon particles.

4. The magnetic recording medium as claimed in claim 1, wherein the nonmagnetic particles comprise abrasives and carbon particles.

5. The magnetic recording medium as claimed in claim 1, wherein the support has 1 to 100 protrusions having a height of 30 nm or more, 0 to 30 protrusions having a height of 40 nm or more, and 0 to 10 protrusions having a height of 50 nm or more in 30 μm ×30 μm squire when measured using ATM.

6. A magnetic recording medium comprising:
   a support;
   an adhesive layer provided directly on the support; and
   a single magnetic layer provided directly on the adhesive layer and having a thickness of 0.3 μm or less, which contains nonmagnetic particles;
   wherein the thickness of the single magnetic layer is equal to or larger than an average particle diameter of the nonmagnetic particles, and
   wherein a surface of the support has 1 to 1,000 protrusions having a height of 30 nm or more, 0 to 500 protrusions having a height of 40 nm or more, and 0 to 200 ems protrusions having a height of 50 nm or more in 30 μm ×30 μm square when measured using ATM.

7. The magnetic recording medium as claimed in claim 6, wherein the nonmagnetic particles comprise abrasives.

8. The magnetic recording medium as claimed in claim 6, wherein the nonmagnetic particles comprise carbon particles.

9. The magnetic recording medium as claimed in claim 6, wherein the nonmagnetic particles comprise abrasives and carbon particles.

10. The magnetic recording medium as claimed in claim 6, wherein the support has 1 to 100 protrusions having a height of 30 nm or more, 0 to 30 protrusions having a height of 40 nm or more, and 0 to 10 or less protrusions having a height of 50 nm or more in 30 μm ×30 μm square when measured using ATM.

* * * * *